E. A. NELSON.
CRANK CASE AND BEARING FOR ENGINES.
APPLICATION FILED DEC. 17, 1914.
1,170,663.
Patented Feb. 8, 1916.
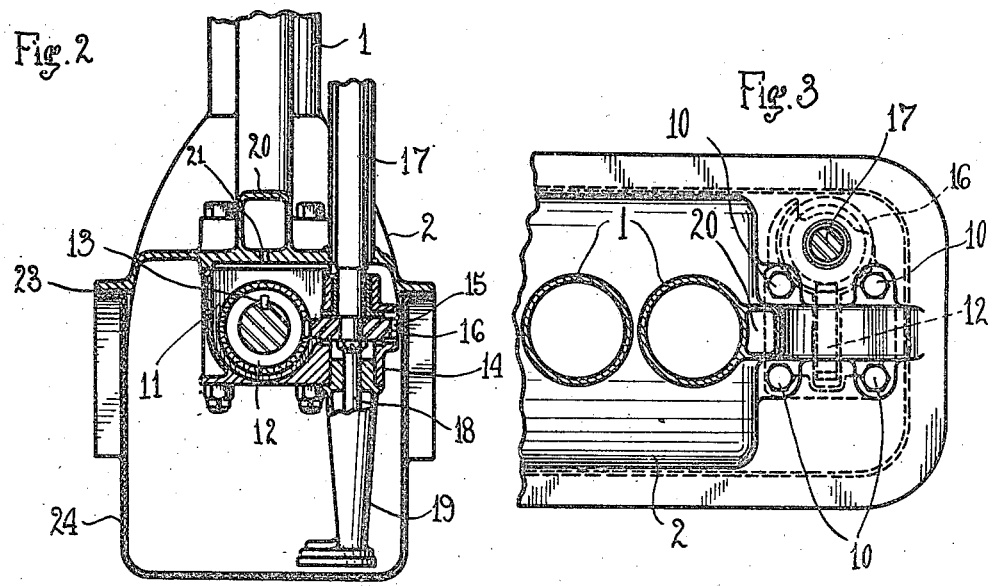
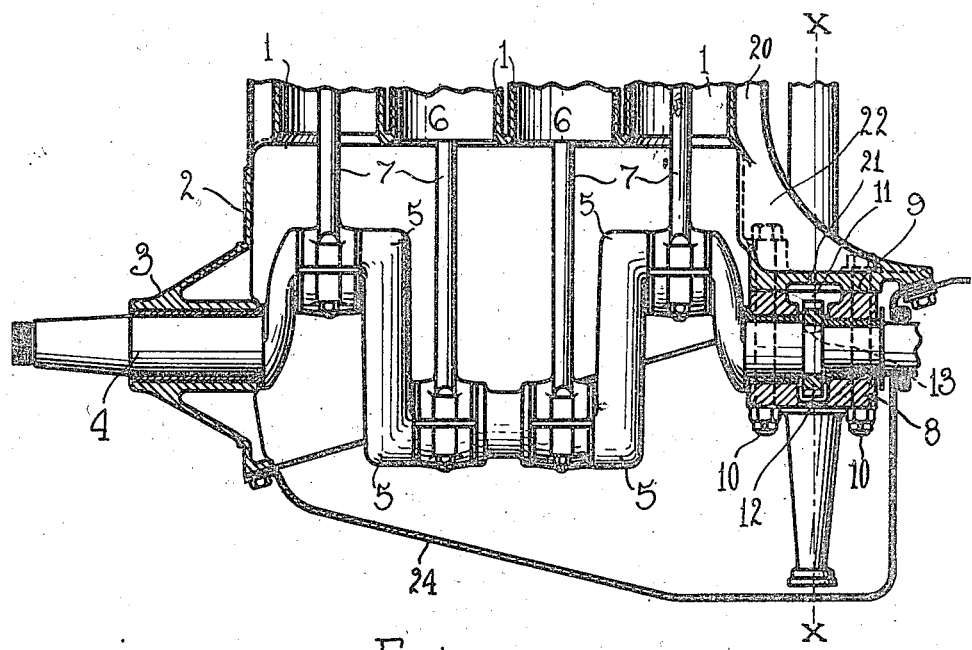
Witnesses
Anna M. Dorr.
Karl H. Butler
Inventor
Emil A. Nelson
By Bartlet & Bartlet
Attorneys

UNITED STATES PATENT OFFICE.

EMIL A. NELSON, OF RONVILLE, MICHIGAN.

CRANK-CASE AND BEARING FOR ENGINES.

1,170,663.      Specification of Letters Patent.      Patented Feb. 8, 1916.

Application filed December 17, 1914. Serial No. 877,655.

*To all whom it may concern:*

Be it known that I, EMIL A. NELSON, a citizen of the United States of America, residing at Ronville, in the county of Wayne and State of Michigan, have invented certain new and useful Improvements in Crank-Cases and Bearings for Engines, of which the following is a specification, reference being had therein to the accompanying drawings.

This invention relates more particularly to an improved construction and arrangement of crank case and crank shaft bearings for internal combustion engines, and its object is to provide a crank case having a solid crank shaft bearing integral therewith and a solid bearing detachably secured to the case in such a manner and so arranged as to combine strength and rigidity with lightness and facility of manufacture and assemblage.

It is also an object of the invention to so construct the case that the lower part thereof may be formed of sheet metal and made readily detachable without affecting the strength or rigidity of the bearings, and to provide certain other new and useful features in the construction and arrangement of parts, all as hereinafter described and more particularly pointed out in the claims, reference being had to the accompanying drawings in which Figure 1 is a longitudinal vertical section through the lower portion of an engine and crank case embodying the invention; Fig. 2 is a transverse section of the same on the line $x$—$x$ of Fig. 1; and Fig. 3 is a plan view of a portion of Fig. 1.

In the drawings, portions of the lower ends of the several engine cylinders are indicated by the numeral 1 and these cylinders are preferably cast integral with an upper portion 2 of the crank case, although they may be made separate therefrom as is the common practice in engine construction, said upper portion being formed at its forward end with an integral solid bearing 3 for the crank shaft 4 whose cranks 5 are connected to pistons 6 by means of connecting rods 7 in the usual manner.

The rear bearing 8 for the crank shaft is preferably a solid bearing block which is secured rigidly to a seat 9 formed therefor upon the rear end of the upper portion 2 of the crank case by means of bolts 10 passing through the block and through openings in the seat. This block is placed by slipping it endwise over the end of the crank shaft and is preferably formed with a recess 11 intermediate its ends opening through the top of the block to receive a small gear or pinion 12 which is operatively connected to a reduced portion of the shaft to turn therewith, in any suitable manner, as by a key 13 in the shaft. This gear is attached to the shaft within the recess by first placing it in the recess and then passing the shaft through the block and gear. When the block is bolted to its seat on the casing, the chamber is closed thereby and the gear is securely held against displacement.

The bearing block 8 is also formed with a lateral projection 14 having a recess or opening 15 in its side to receive a second gear 16 adapted to mesh with the gear 12 and transmit motion therefrom to a vertical shaft 17 upon which it is secured in any suitable manner, the lower end of said shaft being supported in a suitable bearing formed therefor in the laterally projecting portion 14 of the block. This shaft is adapted to drive valves or other mechanism, not shown, and it has a downward extension 18 adapted to drive suitable pump mechanism contained in a casing 19, for pumping oil from the crank case to parts of the engine to be oiled.

The end of the crank case and adjacent side of one of the cylinders, is formed with a duct or passage 20 for conducting oil from the upper part of the engine, back into the crank case, and this duct has its lower end directly over the seat 9 for the block 8 so that by providing an opening 21 therethrough into the chamber 11 of the block, oil is supplied to said chamber to lubricate the bearing and the gears 12 and 16. The inner side of the duct 20 adjacent to the seat preferably opens into the crank case to form an open pocket 22 above the bearing which will catch oil splashed by the cranks and insure an adequate supply to lubricate the bearing and gears at all times. By this arrangement any possibility of the gears becoming detached is obviated and assemblage of the parts is facilitated. The arrangement of oil pocket and duct leading thereto also gives adequate lubrication for the gears without the necessity for feeding oil by means of the pump to the bearing.

The lower edge 23 of the upper part 2 of the crank case is faced off at an inclination to the horizontal plane of the axis of the bearings to form a seat for the lower part or pan 24 of the crank case.
This seat or edge 23 extends in an inclined plane from a point below the forward bearing 3 to substantially the plane of the seat 9 for the bearing block 8, and thus the side walls of the upper part of the crank case are extended downward sufficiently to brace the bearings and give a rigid support for the crank shaft, and at the same time assembly is facilitated and easy access to the connecting rods provided for by making the major portion of the lower half of the case removable. The bearings being entirely supported by the upper part of the crank case permits of forming the pan of sheet metal, and manufacture is greatly facilitated and cheapened by forming the seat or edge 23 straight, thus obviating the necessity of making the upper edge of the pan of irregular form which would not only increase the cost of manufacture but be difficult to secure in place in such a manner as to make a tight joint all along said edge. In this construction the bearings may be very accurately machined and the crank shaft is very readily put in place or removed. In the arrangement shown, the fly wheel (not shown) is adapted to be secured to the forward end of the crank shaft and the solid bearing 3 supports this end of the shaft and the weight of the fly wheel.
A crank case having the several advantages of both the solid or barrel type of crank case and the split type are secured, and the weight and cost of manufacture are reduced.

Obviously changes may be made in the form and arrangement of parts without departing from the spirit of my invention, and I do not therefore limit myself to the construction shown.

What I claim is:—

1. In an engine, a crank case comprising an upper portion and a lower detachable portion, said upper portion being formed with an integral crank shaft bearing, and a detachable crank shaft bearing in alinement with said integral bearing, the line of division between said upper and lower portions being extended below the horizontal plane of the longitudinal axes of said bearings at one end and above said plane at the opposite end.

2. In an engine, a crank case having an integral bearing at one end for a crank shaft and a detachable bearing for said shaft at its opposite end, said case being divided below the horizontal plane of the axes of said bearings adjacent to one bearing and above said plane adjacent to the other bearing to form a lower detachable portion for the crank case.

3. In an engine, a crank case divided into an upper portion and a lower detachable portion, said upper portion being formed at one end with an integral bearing for a crank shaft, and a detachable crank shaft bearing secured to the opposite end of said upper portion, the line of division between said upper and lower portions being adjacent to the plane of the lower side of the integral bearing at one end of the case and adjacent to the plane of the upper side of the detachable bearing at its opposite end.

4. In an engine, a crank case having an upper portion provided with an integral bearing at one end, a detachable bearing at the opposite end of said portion, and a detachable lower portion for the crank case removable independently of said bearings, the plane of the line of division between said upper and lower portions being at an incline to the horizontal plane of the axes of said bearings.

5. In an engine, a crank case divided into an upper portion and a lower detachable portion, said upper portion being formed at one end with an integral bearing for a crank shaft and at its opposite end with a seat for a detachable bearing for the crank shaft, the plane of the line of division between said upper and lower portions being inclined from a point below the horizontal plane of the integral bearing, upwardly to substantially the plane of the seat for the detachable bearing.

6. In an engine, a crank case comprising an upper portion formed with an integral crank shaft bearing at one end and a seat for a detachable crank shaft bearing at its opposite end, the lower edge of said upper portion lying in a plane which is inclined upwardly from front to rear of the case at an angle to the horizontal plane of the axes of said bearings, and a lower crank case portion having a continuous upper edge to seat upon the lower inclined edge of the upper portion.

7. In an engine, a crank case formed with a seat for a crank shaft bearing block, a bearing block to engage said seat formed with a recess in the upper side thereof, a crank shaft extending through the bearing block, and a gear on the shaft within the recess in said block.

8. In an engine, a crank case having a seat for a crank shaft bearing block, a bearing block to engage said seat having a chamber therein opening through one side thereof and closed by the securing of the block to its seat, a crank shaft extending through the block, a gear on the crank shaft within the chamber and means for securing the block to its seat on the crank case.

9. In an engine, the combination of a crank case having a seat for a bearing block, a bearing block secured to said seat and formed with an oil chamber and with a recess therein opening into one side of the chamber, a crank shaft extending through the bearing block, a gear on the crank shaft within the chamber, a gear in the recess to engage the gear in the chamber, and a shaft to which the last named gear is secured.

10. In an engine, the combination of a crank case having a seat for a bearing block and an oil passage leading to the upper side of said seat, a bearing block detachably secured to said seat and provided with a chamber therein, a crank shaft engaging the bearing block and a gear on the crank shaft within the chamber.

11. In an engine the combination of a crank case having a seat for a bearing block and an oil passage leading to the upper side of said seat, a bearing block to engage the lower side of the seat and formed with a chamber and a recess opening from the chamber through the side of the block, a crank shaft in the bearing block, a gear on the shaft in the chamber, a gear in the recess engaging the gear in the chamber, and a shaft having a bearing in the bearing block and to which the gear in the recess is secured.

12. In an engine, the combination of a crank case comprising an upper portion formed with an integral crank shaft bearing at one end and a seat for a bearing block at the opposite end, said crank case portion being formed with an oil pocket above said seat and with a lower edge lying in a plane inclined upwardly and rearwardly from the lower side of the integral bearing to the horizontal plane of the seat, a lower crank case portion having a continuous plane upper edge seated upon the lower edge of the upper portion and detachably secured thereto, a bearing block bolted to said seat, and a crank shaft engaging said bearings.

In testimony whereof I affix my signature in presence of two witnesses.

EMIL A. NELSON.

Witnesses:
G. E. McGRANN,
L. E. FLANDERS.